United States Patent [19]

Ohms

[11] E Re. 30,127

[45] Reissued Oct. 30, 1979

[54] LOAD EJECTION IMPROVEMENT FOR SELF-LOADING SCRAPERS

[75] Inventor: Edward J. Ohms, East Peoria, Ill.

[73] Assignee: Caterpillar Tractor Co., Peoria, Ill.

[21] Appl. No.: 872,700

[22] Filed: Jan. 26, 1978

Related U.S. Patent Documents

Reissue of:

[64] Patent No.: 3,977,102
Issued: Aug. 31, 1976
Appl. No.: 627,827
Filed: Oct. 31, 1975

[51] Int. Cl.[2] ..... B60P 1/42

[52] U.S. Cl. ..... 37/4; 37/126 AE; 414/487; 137/625.6; 91/526; 91/461

[58] Field of Search ..... 37/4, 8, 124 R, 129, 37/126 R, 126 AE; 91/412, 414, 461; 214/510; 137/625.6; 280/489; 198/657, 674, 675

[56] References Cited

U.S. PATENT DOCUMENTS

| | | | |
|---|---|---|---|
| 3,210,869 | 10/1965 | Hein | 37/8 |
| 3,258,926 | 7/1966 | Junck et al. | 37/8 X |
| 3,346,972 | 10/1967 | Johnson | 37/8 |
| 3,386,344 | 6/1968 | Junck et al. | 91/414 |
| 3,526,978 | 9/1970 | Jordan | 37/8 |
| 3,568,718 | 3/1971 | Wilke et al. | 137/625.6 |
| 3,618,984 | 11/1971 | Cook et al. | 280/489 |
| 3,653,132 | 4/1972 | Campbell et al. | 37/8 |
| 3,820,257 | 6/1974 | Junck et al. | 37/8 |
| 3,859,741 | 1/1975 | Reinhardt | 37/8 |
| 3,863,367 | 2/1975 | Gee et al. | 37/8 |

*Primary Examiner*—E. H. Eickholt
*Attorney, Agent, or Firm*—Wegner, Stellman, McCord, Wiles & Wood

[57] ABSTRACT

A control system for the hydraulically powered *conveyor, such as an* auger, of a self-loading [auger] scraper that has an ejector operated by a hydraulic cylinder. One manual control valve starts and stops the auger in conjunction with loading. A second manual control valve powers the ejector cylinder and simultaneously operates a valve to start the auger independently of the first manual control valve.

6 Claims, 3 Drawing Figures

LOAD EJECTION IMPROVEMENT FOR SELF-LOADING SCRAPERS

Matter enclosed in heavy brackets [ ] appears in the original patent but forms no part of this reissue specification; matter printed in italics indicates the additions made by reissue.

BACKGROUND OF THE INVENTION

Self-loading [auger] scrapers *with a conveyor such as an auger* have complex hydraulic systems with a large number of controls at the operator's cab, and in order to minimize the complexity of the operation it is desirable to combine controls where it is practical to do so. The operator must, of course, be able to move the scraper bowl between an elevated road position and a lower loading and unloading position. There is also a control for the bowl apron which closes the front of the bowl when a load is being transported and which is moved for loading and unloading. The auger must operate during loading, and in the case of a fixed auger must also operate during unloading. There is also a pitch and bounce control which should be operative when the unit is in transport mode but which must be locked out for loading and unloading.

A multiple function scraper control valve includes a control handle for manually shifting the valve to operate the ejector. Under most conditions it is essential that the auger operate when the ejector is operating, because otherwise the ejector will jam material into the auger instead of unloading it through the auger.

In order to minimize the number of controls that the operator must use, it is desirable to provide for operation of the auger when the ejector control handle is moved from a first position to a second position for powering the ejector cylinder.

SUMMARY OF THE INVENTION

*The hydraulic control system of the present invention is shown and described as controlling the operation of a rotary hydraulic motor. In the specific embodiment shown the motor drives an auger conveyor that serves as a loading assist for the bowl of a self-loading scraper.*

In accordance with the present invention, the control for auger operation includes a drain line which is open to the reservoir when the auger is not operating, and which must be closed to cause fluid from an auger pump to go to an auger hydraulic motor instead of returning to the reservoir.

There are two normally open valves in the drain line in series. The first of the normally open valves is closed in response to movement of the manual control member for the ejector mechanism from its first position to a second position for powering the ejector cylinder. The second normally open valve is a pilot operated valve to which operating fluid is selectively admitted by operation of a manual pilot selector valve of the type disclosed in U.S. Pat. No. 3,618,984. The primary auger operating control initiates auger operation in conjunction with loading of the scraper bowl, and shifting of the manual pilot selector valve is what controls auger operation under those conditions.

The primary auger control system also includes an unloading relief valve which is normally open so that fluid from auger pump means returns to the reservoir. The unloading relief valve is controlled by a signal line that is normally open to drain through the second normally open valve in the drain line. Closing of said second normally open valve isolates the signal line from the drain line, closing the unloading relief valve and causing fluid from the auger pump means to go through a conduit to the auger motor.

The first normally open valve of the present system is a solenoid operated valve, and the energizing circuit for the solenoid includes a normally open limit switch which is closed by movement of the manual control handle for ejector hydraulic circuit.

THE DRAWINGS

DETAILED DESCRIPTION OF THE INVENTION

Figure 1:
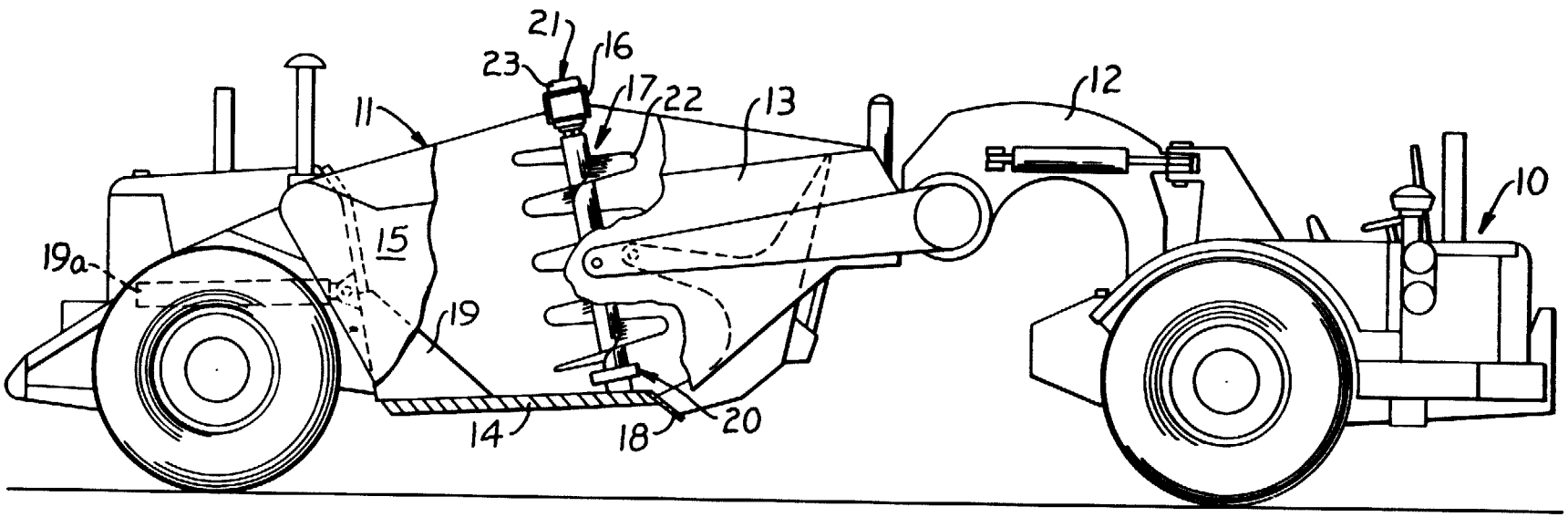
FIG. 1 is a side elevational view, partly in section, of a self-loading auger scraper.

Referring to FIG. 1, the apparatus of the present invention consists generally of a tractor 10 to which a scraper 11 is connected by means of a conventional gooseneck 12. The scraper 11 includes a bowl 13 having a floor 14 and sidewalls 15, and a cross beam 16 between the upper ends of the sidewalls cooperates with the bowl floor 14 in mounting an auger assembly, which is indicated generally at 17 and has its lower end close to a forward cutting edge 18 of the bowl. The scraper is illustrated as provided with ejector means, indicated generally at 19, of the type disclosed and claimed in patent 3,863,367.

The auger assembly 17 consists generally of a supporting bearing assembly, indicated generally at 20, which is secured to the bowl floor 14; auger drive means 21 which is mounted upon the top cross beam 16; and an auger, indicated generally at 22.

In addition to the scraper bowl and auger components illustrated in FIG. 1, the apparatus is to be understood as including a cushion hitch structure of the type disclosed in U.S. Pat. No. 3,311,389.

Figures 2, 3:
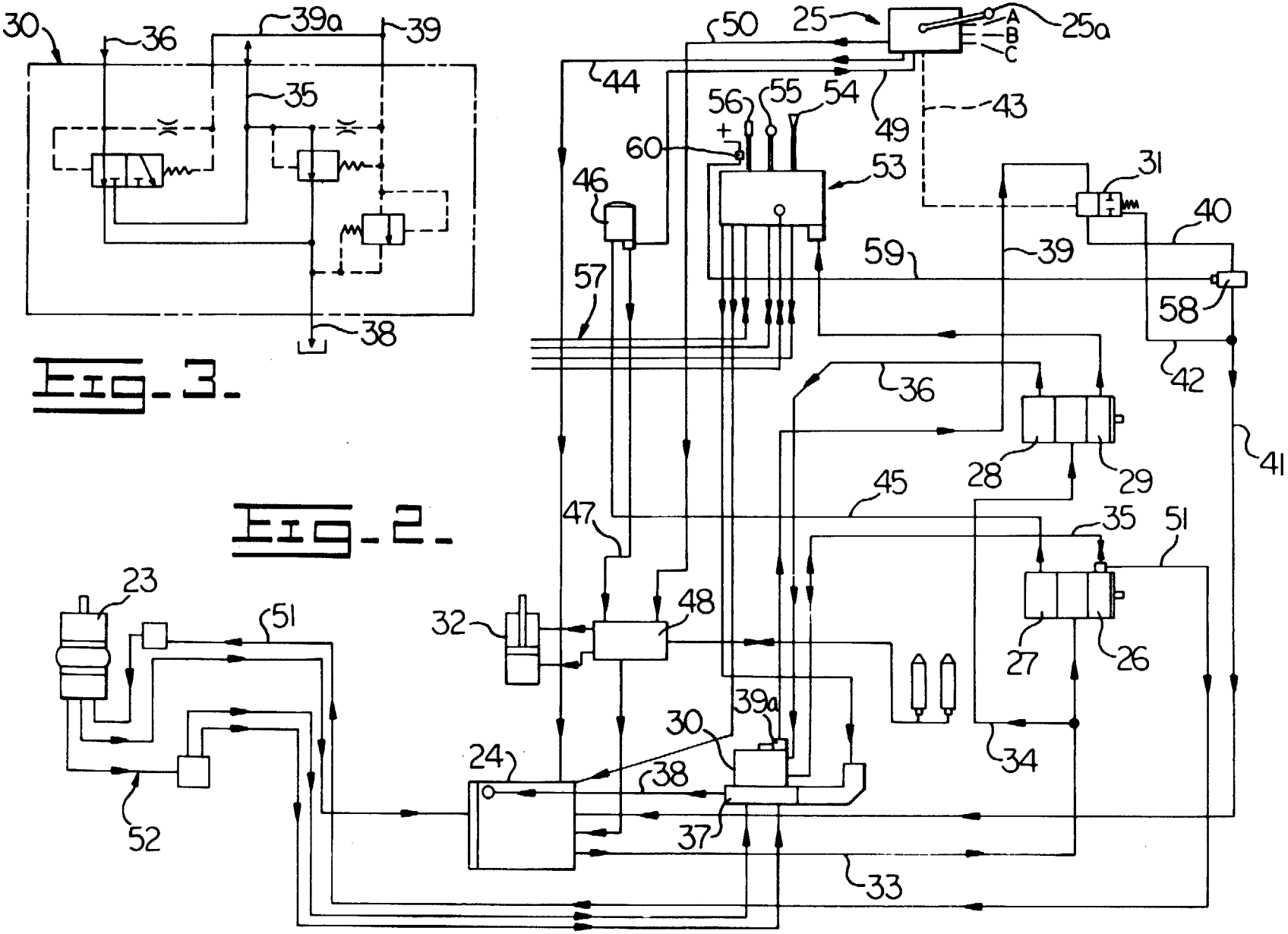
FIG. 2 is a hydraulic circuit diagram of that portion of the hydraulic circuit which relates to operation and control of the auger.
FIG. 3 is a hydraulic schematic view of the unloading relief valve used in the control circuit.

Turning now to FIGS. 2 and 3, the hydraulic operating and control circuit for a hydraulic motor 23 of the auger drive means 21 includes a hydraulic fluid reservoir 24; a manual pilot selector valve 25 of the kind disclosed in patent 3,618,984; a large auger pump 26 having a capacity of 60 gallons per minute and which is coupled with a cushion hitch pump 27 that has a capacity of 8 gallons per minute; a small auger pump 28 that delivers 21 gallons per minute and is coupled with a 60 gallon per minute scraper pump 29 that is not part of the auger operating and control system; a relief and unloading valve 30; and a normally open, pilot operated auger control valve 31; together with the necessary pipes and conduits between the foregoing components, the hydraulic motor 23 and the reservoir 24.

As disclosed in patent 3,618,984, the manual pilot selector valve 25 is a spool valve which has an operating handle 25a that is movable between the A position shown in FIG. 2, a B position, and a C position. In the A position of the pilot selector valve 25 a cushion hitch means, indicated generally at 32, is in a transport mode as disclosed in patent 3,311,389, and the auger motor 23 is idle. In the B position, in accordance with the teachings of patent 3,618,984, the cushion hitch is deactivated with the cushion hitch locked in a bottomed out position as taught in patent 3,311,389, and the auger motor 23 is still idle. In the C position of valve 25 the cushion hitch is still locked down and the auger motor 23 is powered from the pumps 26 and 28 to drive the auger.

The B position of the valve 25 is rarely used, because ordinarily the cushion hitch is lowered and locked only for loading or unloading, and in those situations the auger motor 23 should be driving. However, there are occasional situations when the operator may want to lock down the cushion hitch when the apparatus is in its transport mode so as to afford the maximum possible control over a loaded vehicle being operaed under difficult driving conditions.

A fluid conduit 33 and a branch conduit 34 connect the reservoir 24 with the low pressure sides of the pumps 26, 27, 28 and 29. The high pressure sides of the pumps 26 and 28 connect with the unloading relief valve 30 through respective lines 35 and 36; and as illustrated in FIG. 3, the valve 30 is normally open to the reservoir 24 through a manifold 37 and a drain conduit 38. Thus, the output of the auger pumps 26 and 28 is unloaded to the reservoir in the A position of the manual pilot selector valve 25.

Control of the unloading relief valve 30 is by means of a signal conduit 39 which is joined exteriorly of the valve 30 by a signal conduit 39a so that, in effect, the two signal conduits act as one in the control of the valve 30. The signal line 39 is connected through the normally open auger control valve 31 to a return line 40 which drains directly to the reservoir 24 through a drain line 41 which also may receive fluid from a conventional leakage drain line 42 connected to the valve 31.

A pilot line 43 for the valve 31 is connected to the manual pilot selector valve 25, and in the A position of the pilot selector valve the pilot line 43 is in communication with a drain line 44 through which fluid from the valve 25 returns to the reservoir 24.

Also, in the A position of the pilot selector valve 25 the output of the pump 27 is delivered through a line 45 to a filter 46 from which the principal flow goes through a line 47 to a normally closed control valve 48 for the cushion hitch cylinder 32. The balance of the flow from the filter 46 goes through a line 49 to the pilot selector valve 25, and from there through a pilot line 50 the pressure from which keeps the normally closed valve 48 open as long as the pilot selector valve 25 is in the A position.

When the pilot selector valve is moved to the B position, the fluid from the line 49 is isolated from the pilot line 50 and returns through the drain line 44 to the reservoir 24. In this position of the pilot selector valve the condition of the auger control valve 31 remains unchanged.

When the pilot selector valve 25 is moved to the C position, it terminates communication between the pilot line 43 and the drain line 44 and places the line 49 from the cushion hitch pump 27 into communication with the pilot line 43 so as to close the valve 31. This blocks communication between the signal lines 39–39a and the return line 40 and drain line 41 and causes the unloading relief valve 30 to break communication between the lines 35 and 36 and the drain line 38. The output from the auger pump 28 through the line 36 to the valve 30 is shifted within the valve to the line 35, as indicated by the reverse arrows in that line; so the output from the pump 28 combines with that of the pump 26 and goes through a drive conduit 51 to the auger motor 23 from which the fluid returns to the reservoir 24 through several lines which are numbered collectively 52.

The output from the scraper pump 29 goes to a multiple function scraper control valve, indicated generally at 53, which is provided with a scraper control handle 54, an apron control handle 55, and an ejector control handle 56. A first conduit 57 of a group of conduits carries fluid from the control valve 53 to an ejector cylinder 19a (FIG. 1), while others of said group of conduits take fluid to a bowl cylinder or to an apron cylinder, depending upon the positions of the manual controls 54, 55 and 56.

The manual control 56 has a first position in which no fluid is supplied to the ejector cylinder 19a, and a second position in which fluid is supplied through the line 57.

Simultaneous control of the power to the auger motor 23 and to the ejector cylinder 19a is by means of a normally open solenoid valve 58 which is in the drain line 40, and a solenoid energizing circuit 59 which includes a normally open limit switch 60 that is located in operative relationship to the ejector control handle 56. Movement of the control handle 56 from its first position to its second position mechanically closes the limit switch 60 to energize the solenoid of the valve 58 and close said valve for the purpose of isolating the signal line 39 from the drain line 41, even though the auger control valve 31 is still open.

Thus, the normally open pilot operated auger control valve 31 and the normally open solenoid valve 58 are positioned in series in the drain line 40–41 so that closing of either valve causes the unloading relief valve 30 to be closed and thus causes fluid under pressure to go from the pumps 26 and 28 to the auger motor 23.

The foregoing detailed description is given for clearness of understanding only and no unnecessary limitations should be understood therefrom as modifications will be obvious to those skilled in the art.

What is claimed is:

1. In a self-loading auger scraper that includes a scraper bowl, a generally upright auger mounted in the forward portion of the bowl, a hydraulic motor for driving the auger, an ejector mechanism including a generally upright ejector member and a hydraulic cylinder for reciprocating the ejector member between the rear of the bowl and the front of the bowl, a fluid reservoir, first pump means for supplying fluid under pressure from the reservoir to the ejector cylinder, second pump means for supplying fluid under pressure from said reservoir to the auger motor, and a control system that includes a first manually actuated valve for directing the output of said second pump means selectively to the auger motor or to the reservoir and a second manually actuated valve which is movable between a first position in which fluid from the first pump is blocked from the ejector cylinder and a second position in which such fluid flows to said cylinder to move the ejector member, means for driving the auger when the ejector member is operated comprising, in combination:

a drain line which is open to the reservoir when the auger motor is idle and which is closed to cause the output of the second pump means to be directed to the auger motor;

a first normally open valve in said drain line;

and means controlled by movement of the second manually actuated valve from its first position to its second position for closing said normally open valve.

2. The combination of claim 1 in which the normally open valve is solenoid operated, and the means controlled by movement of the second manually actuated valve comprises a normally open switch in an energizing circuit for said solenoid, and means for closing said switch in response to movement of said second manually actuated valve.

3. The combination of claim 2 in which the switch is a limit switch and the means for closing said switch is mounted on the manual actuator for the second valve.

4. The combination of claim 1 in which the control system for the auger motor includes a normally open, pilot operated auger control valve, an unloading valve which is normally open to connect the second pump means to the reservoir and which has a signal line that is open to said drain line through said pilot operated valve, in which the first manually actuated valve is a pilot selector valve which is movable from a first position to a second position to pressurize a pilot line for said auger control valve, and thereby close said valve to isolate said signal line from the drain line and thus close the unloading valve, the normally open valve in the drain line being in series with said normally open auger control valve.

5. The combination of claim 1 which includes a second normally open valve in the drain line in series with the first normally open valve in said line, and an operative connection between said first manually actuated valve and said second normally open valve to close the latter valve upon manual actuation of the former valve.

*6. In a self-loading scraper that includes a scraper bowl, a generally upright loading assist mounted in the forward portion of the bowl, a hydraulic motor for driving the loading assist, an ejector mechanism including a generally upright ejector member and a hydraulic cylinder for reciprocating the ejector member between the rear of the bowl and the front of the bowl, a fluid reservoir, first pump means for supplying fluid under pressure from the reservoir to the ejector cylinder, second pump means for supplying fluid under pressure from said reservoir to the hydraulic motor, and a control system that includes a first manually actuated valve for directing the output of said second pump means selectively to the hydraulic motor or to the reservoir and a second manually actuated valve which is movable between a first position in which fluid from the first pump is blocked from the ejector cylinder and a second position in which such fluid flows to said cylinder to move the ejector member, means for driving the loading assist when the ejector member is operated comprising, in combination:*

*a drain line which is open to the reservoir when the hydraulic motor is idle and which is closed to cause the output of the second pump means to be directed to the hydraulic motor;*

*a first normally open valve in said drain line;*

*and means controlled by movement of the second manually actuated valve from its first position to its second position for closing said normally open valve.*

* * * * *